(12) United States Patent
Wang

(10) Patent No.: US 7,047,183 B2
(45) Date of Patent: May 16, 2006

(54) METHOD AND APPARATUS FOR USING WILDCARDS IN SEMANTIC PARSING

(75) Inventor: YeYi Wang, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1086 days.

(21) Appl. No.: 09/934,224

(22) Filed: Aug. 21, 2001

(65) Prior Publication Data

US 2003/0074186 A1    Apr. 17, 2003

(51) Int. Cl.
    *G06F 17/27* (2006.01)
(52) U.S. Cl. .......................................... 704/9; 704/257
(58) Field of Classification Search .................... 704/9, 704/257, 1–10
    See application file for complete search history.

(56) References Cited

U.S. PATENT DOCUMENTS

| | | | | |
|---|---|---|---|---|
| 5,748,841 | A | * | 5/1998 | Morin et al. ................. 704/257 |
| 6,076,051 | A | * | 6/2000 | Messerly et al. .............. 704/9 |
| 6,138,098 | A | * | 10/2000 | Shieber et al. .............. 704/257 |
| 6,658,377 | B1 | * | 12/2003 | Anward et al. ................. 704/9 |

OTHER PUBLICATIONS

Alabiso, B. et al. "LEAP: Language Enabled Applications," Proceedings of the First Workshop on Human-Machine Conversation, Bellagio, Italy (Jul. 1997).
Lavie, A., "GLR*: A Robust Parser for Spontaneous Spoken Language," Proceedings of ESSLLI-96 work-shop on Robust Parsing, Prague, Czech Republic (Aug. 1996).
Miller, S. et al., "Hidden Understanding Models of Natural Language," Proceedings of the 31st Annual Meeting of the Association for Computational Linguistics, New Mexico State University (1994).
Ward, W., "The CMU Air Travel Information Service: Understanding Spontaneous Speech," Proceedings of the DARPA Speech and Natural Language Workshop (1990).
Ward, W. "Understanding Spontaneous Speech: the Phoenix System," IEEE International Conference on Acoustics, Speech and Signal Processing (1991).
Microsoft Speech SDK with SAPI 5.0, 94 pages (Sep. 1999).
Wang, K., "A Plan-based Dialog System With Probabilistic Inferences," 5 pages.
Wang, K., "An Event-Driven Model for Dialogue System," Proc. ICSLP-98, (Dec. 1998).
Gorrin, A. et al., "How May I Help You?" Speech Communications, vol. 23, (1997).

(Continued)

*Primary Examiner*—David D. Knepper
*Assistant Examiner*—Qi Han
(74) *Attorney, Agent, or Firm*—Theodore M. Magee; Westman, Champlin & Kelly, P.A.

(57) ABSTRACT

A method and apparatus perform semantic parsing by designating one or more words in an input text stream as wildcards. Under some embodiments, partially constructed parses formed from other words in the text stream are used to control when a later word will be identified as a wildcard. In particular, if a partial parse is expecting a semantic token that begins with a wildcard, the next word in the input text segment is designated as a wildcard term. If none of the existing partial parses are expecting a semantic token that begins with a wildcard, the next word is not designated as a wildcard

20 Claims, 8 Drawing Sheets

| | POPPED FROM CANDIDATE LIST | ITEMS ADDED TO CHART CONTENTS |
|---|---|---|
| 500 | SCHEDULE | <SCH. MEETING>= SCHEDULE •A MEETING |
| 502 | <WILDCARD> | <SUBJECT>= <WILDCARD>• |
| | | <EMAIL BODY>=<WILDCARD>•<CLOSING> |
| 504 | <SUBJECT> | |
| 506 | A | <SCH. MEETING>= SCHEDULE A• MEETING |
| 508 | MEETING | <CANCEL MEETING>= MEETING• TODAY IS CANCELLED |
| | | <SCH. MEETING>= SCHEDULE A MEETING• |
| 510 | <SCH. MEETING> | <SCH. NEW MEETING>=<SCH. MEETING>•<MEETING-PROP.><DATE> |
| 512 | TO | <ABOUT>=TO •DISCUSS |
| 514 | DISCUSS | <ABOUT>=TO DISCUSS• |
| 516 | <ABOUT> | <MEETING-PROP.>=<ABOUT>•<SUBJECT> |

OTHER PUBLICATIONS

"A Stochastic Model of Human-Machine Interaction for Learning Dialog Strategies," IEEE Transactions on Speech and Audio Processing, vol. 8, No. 1, pp. 11-23, (Jan. 2000).

"The Thoughtful Elephant: Strategies for Spoken Dialog Systems," IEEE Transactions on Speech and Audio Processing, vol. 8, No. 1, pp. 51-62, (Jan. 2000).

"JUPITER: A Telephone-Based Conversational Interface for Weather Information," IEEE Transactions on Speech and Audio Processing, vol. 8, No. 1, pp. 85-96, (Jan. 2000).

Weimer-Hastings, Peter and Zipitria, Iraide, "Rules for Syntax, Vectors for Semantics," In: Proceedings of the Twenty-Third Annual Conference of the Cognitive Science Society, 1991.

Wang, Ye-Yi, "A Robust Parser for Spoken Language Understanding," Eurospeech 1999.

Wang, Ye-Yi, "Robust Language Understanding in Mipad," ICASSP, 2001.

Wang, K., "Implementation of Multimodal Dialog System Using Extended Markup Languages," Proceedings of ICSLP-2000, Oct. 2000, 6 pages.

* cited by examiner

| POPPED FROM CANDIDATE LIST | ITEMS ADDED TO CHART CONTENTS |
|---|---|
| SCHEDULE | <SCH. MEETING>= SCHEDULE •A MEETING |
| <WILDCARD> | <SUBJECT>= <WILDCARD>• |
| <SUBJECT> | <EMAIL BODY>=<WILDCARD>•<CLOSING> |
| A | <SCH. MEETING>= SCHEDULE A• MEETING |
| | <CANCEL MEETING>= MEETING• TODAY IS CANCELLED |
| MEETING | <SCH. MEETING>= SCHEDULE A MEETING• |
| <SCH. MEETING> | <SCH. NEW MEETING>=<SCH. MEETING>•<MEETING-PROP.><DATE> |
| TO | <ABOUT>=TO •DISCUSS |
| DISCUSS | <ABOUT>=TO DISCUSS• |
| <ABOUT> | <MEETING-PROP.>=<ABOUT>•<SUBJECT> |

500 — SCHEDULE
502 — <WILDCARD>
504 — <SUBJECT>
506 — A
508 — MEETING
510 — <SCH. MEETING>
512 — TO
514 — DISCUSS
516 — <ABOUT>

FIG. 5

| POPPED FROM CANDIDATE LIST | ITEMS ADDED TO CHART CONTENTS |
|---|---|
| THE | |
| <WILDCARD> | <SUBJECT>=<WILDCARD>• |
| <SUBJECT> | <EMAIL BODY>=<WILDCARD>•<CLOSING> |
| <MEETING-PROP.> | <MEETING-PROP.>=<ABOUT><SUBJECT>• |
| BONUS | <SCH. NEW MEETING>=<SCH. MEETING><MEETING-PROP.>•<DATE> |
| STRUCTURE | <DATE>= AT• <TIME> |
| AT | <LOCATION>= AT• REDMOND |

FIG. 6

| POPPED FROM CANDIDATE LIST | ITEMS ADDED TO CHART CONTENTS |
|---|---|
| FOUR | <NUMBER>=FOUR• |
| <NUMBER> | <TIME>=<NUMBER> •O'CLOCK |
| O'CLOCK | <TIME>=<NUMBER> O'CLOCK• |
| <TIME> | <DATE>=AT <TIME>• |
| <DATE> | |
| <SCH. NEW MEETING> | |

FIG. 7

METHOD AND APPARATUS FOR USING WILDCARDS IN SEMANTIC PARSING

FIELD OF THE INVENTION

The present invention relates to natural language understanding. In particular, the present invention relates to semantic parsing.

BACKGROUND OF THE INVENTION

In natural language understanding, a computer system receives a string of input text and attempts to identify a semantic meaning represented by the input text. In many systems, this can be achieved by parsing the input text into semantic tokens and combining the semantic tokens to form larger tokens until a single token spans the entire text segment.

To construct a semantic parser, the designer of the parser must identify the words and/or semantic tokens that can be represented by a higher level semantic token. For the conversion from words to semantic tokens, this involves identifying the different words that a user could use to express the semantic idea represented by the semantic token.

In some situations, it is difficult or impossible to list all of the possible ways in which a user will express a semantic idea. For example, it is extremely difficult, if possible, to anticipate the ways in which a user will express the subject of a meeting. Because of this, most semantic parsers are underdefined in that they are not able to identify the meaning of possible text inputs from a user. Thus, a semantic parser is needed that is more robust in accepting unpredictable text.

SUMMARY OF THE INVENTION

A method and apparatus perform semantic parsing by designating one or more words in an input text stream as wildcards. Under some embodiments, partially constructed parses formed from other words in the text stream are used to control when a later word will be identified as a wildcard. In particular, if a partial parse is expecting a semantic token that begins with a wildcard, the next word in the input text segment is designated as a wildcard term. If none of the existing partial parses are expecting a semantic token that begins with a wildcard, the next word is not designated as a wildcard.

BRIEF DESCRIPTION OF THE DRAWINGS

FIGS. 5, 6 and 7 show the contents of the chart during the parse of an input text string under one embodiment of the present invention.

DETAILED DESCRIPTION OF ILLUSTRATIVE EMBODIMENTS

Figure 1:
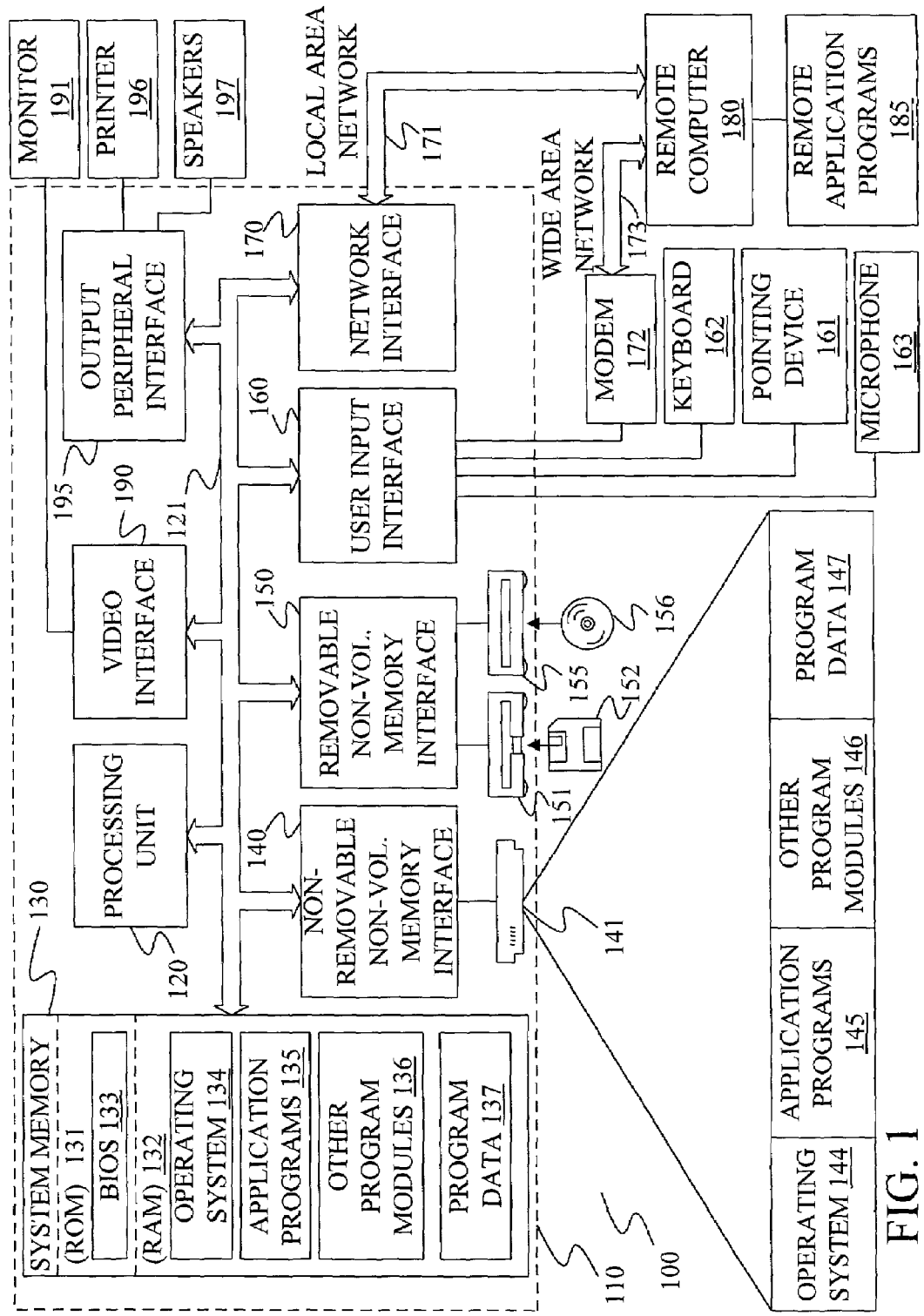
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
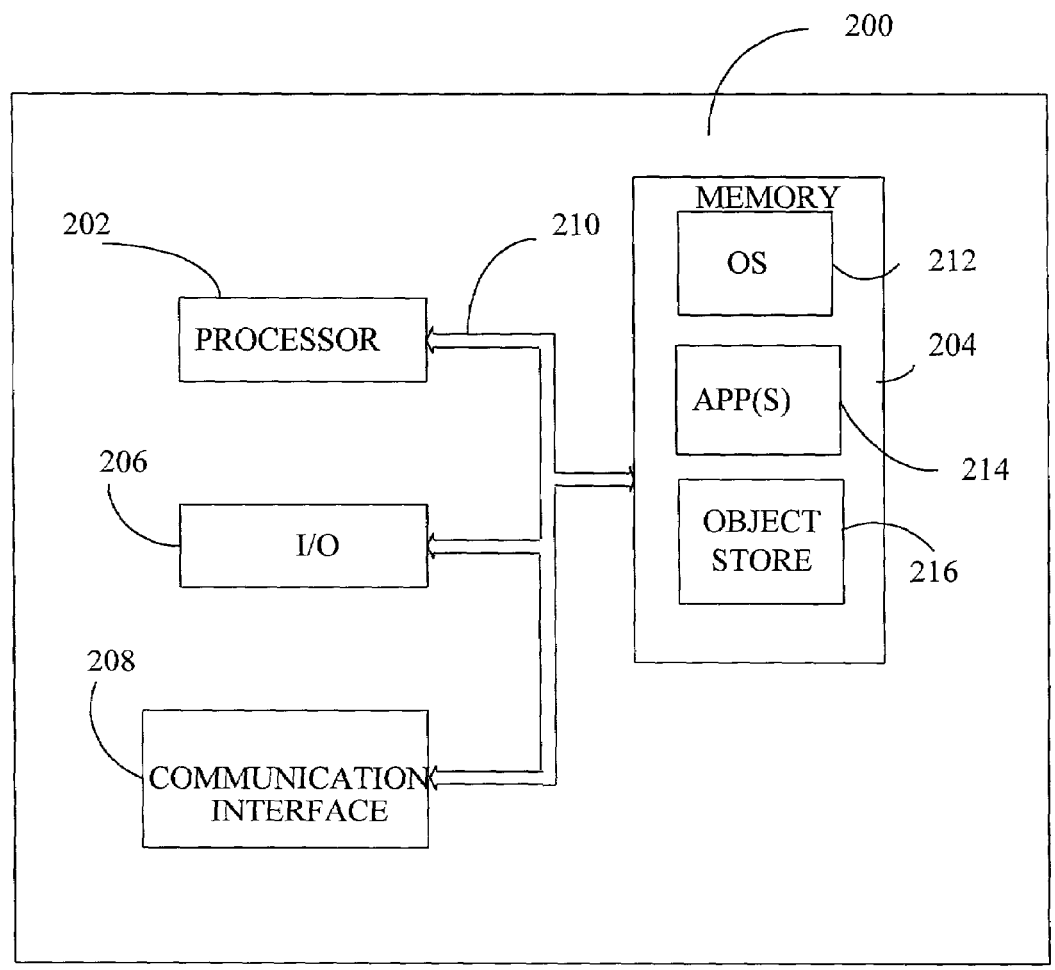
FIG. 2 is a block diagram of a mobile device in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
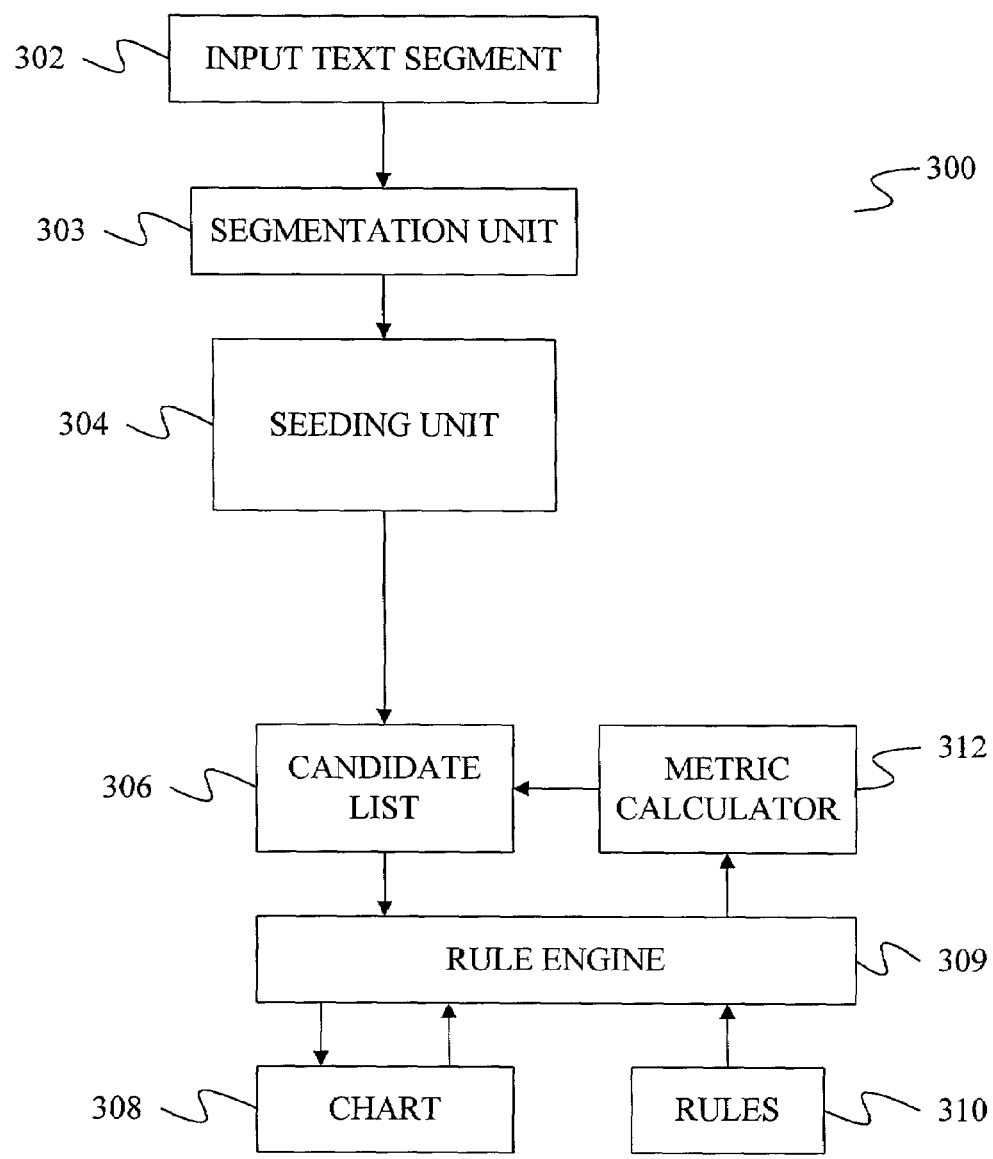
FIG. 3 is a block diagram of a natural language parser.

FIG. 3 provides a block diagram of a parser 300 in which the present invention may be practiced. In parser 300, a segmentation unit 303 divides an input text segment 302 into individual words, which are passed to a seeding unit 304. Seeding unit 304 places one of the words into a candidate list 306 each time the candidate list is empty.

The word in the candidate list is "popped" or removed from the candidate list by a rule engine 309. Rule engine 309 uses the popped word to access a semantic rule set 310 to identify semantic tokens and the related rules that are activated by the popped word. A semantic token is said to be activated by a word or other semantic token according to a related rule when the word or other semantic token is the first child node in the related rule for the semantic token. In a left-to-right parser, the first child node is the left-most child. For example, the semantic token <Meeting Property> is defined with the rule <ABOUT><SUBJECT>, where <ABOUT> is the left-most child node and <SUBJECT> is the right-most child node.

If the activated semantic token is only partially defined by the current word according to the related rule, a partial parse of the semantic token is formed and is added to chart 308. If the activated semantic token is fully defined by the current word, the semantic token is placed in candidate list 306.

The word from the candidate list is also compared to partial parses in chart 308 to determine if any of the partial parses can be extended by the popped word. Partial parses that can be extended but not completed by the word are extended to form new partial parses, and the new partial parses are placed in the chart with the previous forms of the partial parses. Partial parses that are extended and completed by the word result in new full parses, that are added to both chart 308 and candidate list 306.

Under many embodiments, before a semantic token is placed in candidate list 306, it is scored by a metric calculator 312 based on some scoring metric. Under one embodiment, the scoring metric is based on the number of words covered by the semantic token, the number of levels of semantic tokens formed beneath the semantic token, and the total number of semantic tokens beneath the semantic token. The score provided to a semantic token is used to order the tokens in candidate list 306 so that semantic tokens that are more likely to appear in the final parse are popped before other tokens.

Rule engine 309 removes the semantic tokens placed in the candidate list one at a time. For each semantic token, rule engine 309 determines if another semantic token is activated by the popped semantic token and whether any partial parses can be extended based on the popped semantic token. It then updates the chart and candidate list. This continues until all of the semantic tokens have been removed from the candidate list. At that point, the next word in the text segment is added to the candidate list.

Figure 4:
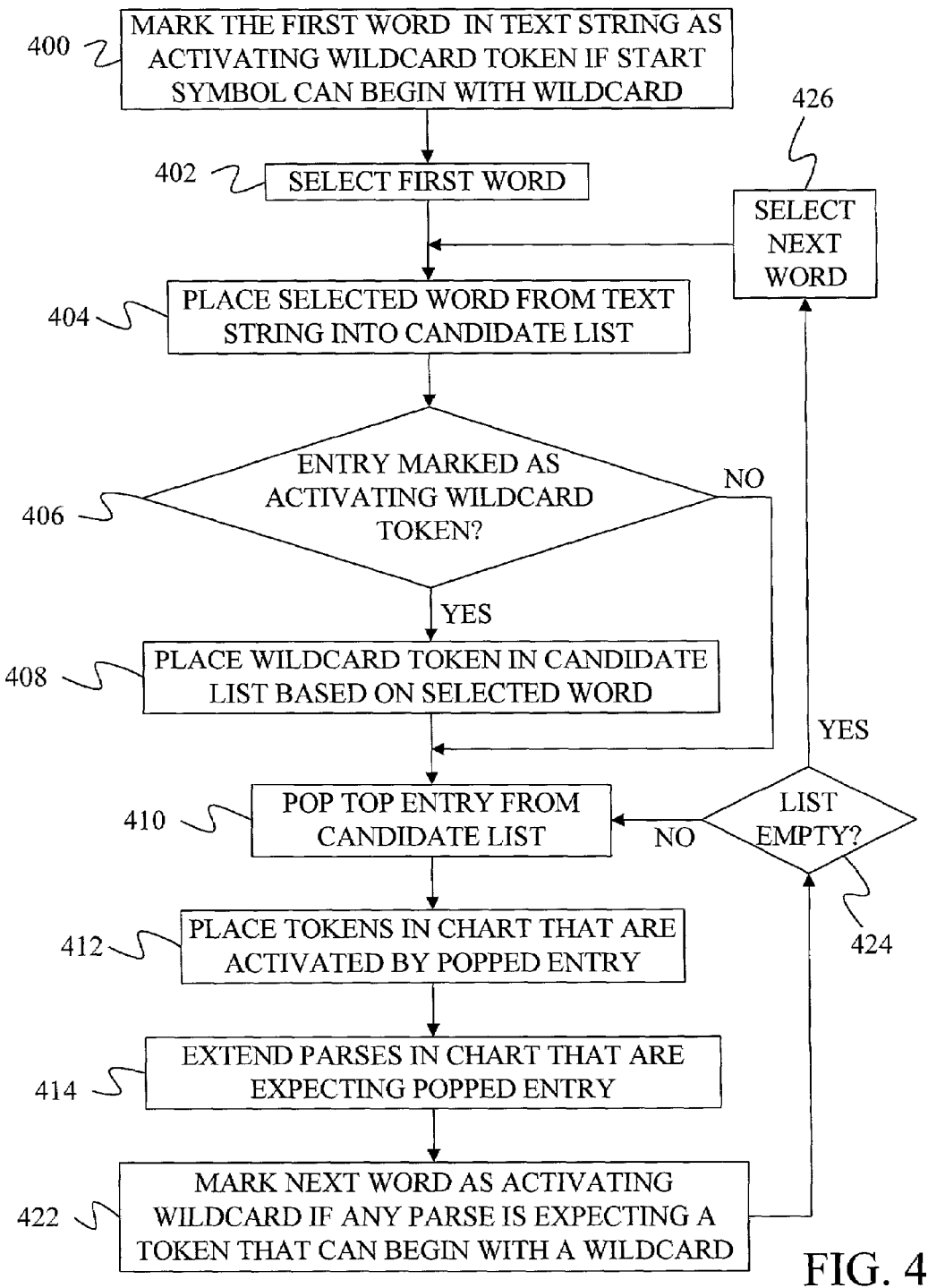
FIG. 4 is a flow diagram of a method of parsing using wildcards under embodiments of the present invention.

FIG. 4 is a flow diagram of a method of parsing text under the present invention while utilizing wildcard tokens.

The method of FIG. 4 is described below with reference to the tables of FIGS. 5, 6 and 7, which show the items that are added to chart 308 after particular values have been popped from candidate list 306. In particular, FIGS. 5, 6 and 7 show the items added to the chart as the phrase "Schedule a meeting to discuss the bonus structure at 4:00" is parsed under the present invention. In FIGS. 5, 6 and 7, the items added to the chart are shown in a column labeled "ITEMS ADDED TO CHART CONTENTS" and the last entity taken from the candidate list is shown in a column labeled "POPPED FROM CANDIDATE LIST". The parse shown in FIGS. 5, 6 and 7 utilizes a grammar that contains the following definitions:

```
<START>         → <SCH.NEW MEETING>
<START>         → <EMAIL BODY>
<SCH.NEW MEETING> → <SCH.MEETING>
                      <MEETING PROP.> <DATE>
<SCH.MEETING>   → schedule a meeting
<MEETING PROP.> → <ABOUT><SUBJECT>
<DATE>          → at <TIME>
<TIME>          → <NUMBER> o'clock
<SUBJECT>       → <WILDCARD>
<ABOUT>         → to discuss
<LOCATION>      → at Redmond
<CANCEL MEETING> → meeting today is cancelled
<EMAIL BODY>    → <WILDCARD> <CLOSING>
<NUMBER>        → one | two | three | four | . . .
```

In step 400 of FIG. 4, the first word in the input text string is marked as activating a wildcard token if the start symbol of the grammar, <START>, can begin with a wildcard. As shown below, marking a word as activating a wildcard token causes the wildcard token to be introduced into the candidate list at the same time that the word is introduced into the candidate list.

At step 402, the first word in the text string is selected and at step 404 is placed into the candidate list. At step 406, the selected word is examined to determine if it is marked as activating a wildcard. If it is marked as activating a wildcard, a wildcard token is placed in the candidate list at step 408.

At step 410, the top entry in the candidate list is popped from the candidate list, and at step 412 tokens activated by the first entry, together with the related rule, are placed in the chart.

The effects of steps 410 and 412 on the first word in a text string can be seen in FIG. 5 where the word "Schedule" is popped from the candidate list, causing the token <SCH.MEETING> to be added to the chart. In FIG. 5, the <SCH.MEETING> token is shown along with the related rule to indicate how much of the token has been found in the text string. In particular, the notation a•bc is used to indicate the extent to which the token has been parsed where a, b, and c are all children of the token and the "•" is to the right of the last child of the token in the rule that has been popped from the candidate list. Thus, in entry 500 of FIG. 5, the <SCH.MEETING> token is set equal to "schedule•a meeting" to indicate that the full semantic token is formed from the three terminal nodes "schedule", "a" and "meeting" and that thus far only the terminal node "schedule" has been found. If the dot is not at the end of the related rule for a token, the token forms a partial parse; if the dot is at the end of the related rule, the token is called a full parse.

Note that although only a single token is shown as being activated in entry 500 for the terminal word "Schedule", those skilled in the art will recognize that in most systems, many more tokens would be activated for this word. The single token is shown in FIG. 5 to clarify and simplify the description of the present invention.

At step 414 of FIG. 4, the word popped from the candidate list is used to extend any existing parses in the chart. During the first pass through step 414, there are no partial parses in the chart, so there are no parses to extend at step 414.

At step 422, new partial parses are examined to determine if any of the partial parses are expecting a semantic token that can begin with a wildcard. If any of the new partial parses are expecting such a semantic token, the next word in the text string is marked as activating a wildcard.

Note that by only designating words as activating the wildcard semantic token when the word is the first word in the text string and the grammar start symbol <START> can begin with a wildcard; or when a partial parse is expecting a token that can begin with a wildcard, the present invention avoids activating the wildcard semantic token for every word in the input text string. This greatly simplifies the complexity of parsing the text since semantic tokens that begin with a wildcard do not have to be introduced into the chart for each word in the input text string. Instead, a top down filter is applied that only causes the <WILDCARD> semantic token to be introduced when a higher level semantic token is expecting a wildcard.

Under one embodiment, to determine whether a token can begin with a wildcard, an entry in a database for each token is examined. These entries are formed before parsing begins by first finding the lowest level semantic tokens (preterminals) that can begin with a wildcard and then finding each higher level token in which the lower level token appears as the first token in the higher level token. For example, for semantic tokens A, B, C, D, E, F, G, and H that have the following relationship:

H=FG

F=E

E=CD

C=<WILDCARD>AB

The semantic token C would first be marked as being able to begin with a wildcard, then semantic token E would be marked as being able to begin with a wildcard token based on the fact that it begins with semantic token C. Next, semantic token F would be designated as being able to begin with a wildcard since it could be formed directly from semantic token E. Lastly, semantic token H would be marked as being able to begin with wildcard since it can be formed from semantic tokens F and G.

Note that semantic tokens, even when marked as being able to begin with a wildcard, do not have to begin with a wildcard. For example, semantic token F above is defined as being activated by semantic token E. However, semantic token F may also be designated as being activated by semantic token I. If semantic token I does not begin with a wildcard, it is possible to have semantic token F activated even when a wildcard is not popped from the candidate list.

After step 422, the process of FIG. 4 continues at step 424, where the candidate list is examined to determine if it is empty. If it is not empty, the top entry in the candidate list is popped at step 410. In the example of FIG. 5, this return to step 410 causes the wildcard token to be popped from the candidate list and any tokens activated by a wildcard are placed in the chart at step 412.

Steps 410 and 412 are shown in FIG. 5 by entry 502, which shows that the semantic token <EMAIL BODY> has been placed in the chart based on the <WILDCARD> semantic token being removed from the candidate list. The selection of the wildcard token from the candidate list also activates a <SUBJECT> semantic token. However, the <SUBJECT> token is fully defined by the <WILDCARD> token. Because of this, the <SUBJECT> token is placed in both the chart and candidate list 306 as a fully parsed semantic token.

At step 414, the chart is examined to determine if any partial parses in the chart are expecting a wildcard. If they are expecting a wildcard, the partial parses are extended.

The process then continues at step 422 where the new partial parses are checked to see if any of them are expecting a token that can begin with a wildcard. The candidate list is then checked at step 424 to see if it is empty. Since the candidate list now contains the <SUBJECT> semantic token, the <SUBJECT> semantic token is popped from the candidate list at step 410 as shown in entry 504 of FIG. 5. At step 412 the tokens activated by the <SUBJECT> token are placed in the chart. Note that in FIG. 5, the <SUBJECT> token does not activate any higher level semantic tokens, so no items are added to the chart.

For the <SUBJECT> semantic token, there are no parses in the chart that can be extended by the semantic token at step 414. As such, the process of FIG. 4 continues at step 422. Since no new partial parses have been introduced, the process then continues at step 424 where the candidate list is examined to determine if it is empty. In the example of FIG. 5, after the <SUBJECT> semantic token has been removed, the list is empty and the process of FIG. 4 continues at step 426 where the next word in the input string is selected and is placed in the candidate list at step 404. The steps of FIG. 4 are then repeated until all of the words in the input text string have been processed.

In the example of FIG. 5, the next word selected from the input string is the word "a". When this word is popped from the candidate list, as shown in entry 506, no additional semantic tokens are activated. However, the semantic token <SCH.MEETING> has its partial parse extended resulting in a new partial parse for <SCH. MEETING> being added to the chart with the dot moved to the right of the word "a". Since the word "a" does not match the partial parse for <EMAIL BODY>, the parse for that token is not extended.

Under most embodiments of the present invention, partial parses are prohibited from being extended by complete constituents if the constituents are too far removed from the partial parse. In some embodiments, a constituent is too far removed if any words in the input text are skipped when extending the partial parse. In other embodiments, word skipping is allowed so that the system is more robust to grammatical noise in the input text. In the case of the partial parse for <EMAIL BODY>, the partial parse will not be extended further because "a" did not activate the <CLOSING> semantic token.

The next word taken from the input string and placed in the candidate list is the word "meeting". When this word is popped from the candidate list, it activates a semantic token <CANCEL MEETING> as shown by entry 508 of FIG. 5. The word "meeting" also completes the parse of the semantic token <SCH.MEETING>, resulting in a new full parse for <SCH. MEETING> that is added to the chart and the candidate list.

The semantic token <SCH.MEETING> is then popped from the candidate list as shown by entry 510. This semantic token causes a higher level semantic token <SCH. NEW MEETING> (short for schedule new meeting) to be activated.

After the <SCH.MEETING> token has been popped from the candidate list, the candidate list is empty and the next word in the input text string is added to the candidate list. The next word is the word "to" which is popped from the candidate list in entry 512 of FIG. 5. As shown in entry 512, the word "to" activates the semantic token <ABOUT>.

In FIG. 5, the word "discuss" is the next word to be popped from candidate list. As shown in entry 514, the word "discuss" does not activate any new semantic tokens. However, the term "discuss" completes the partial parse for the semantic token <ABOUT>. Because of this, a full parse for the semantic token <ABOUT> is added to the candidate list and the chart.

As shown in entry 516 of FIG. 5, when the semantic token <ABOUT> is removed from the candidate list, it activates a higher level semantic token <MEETING PROP.> (short for "meeting property"). This higher level semantic token has two children, the semantic token <ABOUT> and the semantic token <SUBJECT>. As shown above, the <SUBJECT> semantic token is activated by the <WILDCARD> semantic token. Because of this, the <MEETING PROP.> semantic token is expecting a semantic token <SUBJECT> that can begin with a <WILDCARD>. As such, at step 422, the next word in the input string is marked as activating a wildcard.

In the example of FIGS. 5, 6 and 7, the next word in the input string is the word "the". As the word "the" is placed into the candidate list, it causes the <WILDCARD> semantic token to be generated and placed in the candidate list too. As shown by entry 600 of FIG. 6, the word "the" does not cause any changes to the entries in the chart.

Entry 602 of FIG. 6 shows the items added to the chart contents when the <WILDCARD> semantic token for the word "the" is taken from the candidate list. This semantic token activates the <EMAIL BODY> semantic token, which is placed in the chart. It also activates and completes the <SUBJECT> token causing a full parse for the <SUBJECT> semantic token to be placed in the candidate list and the chart.

In entry 604, the <SUBJECT> token is popped from the candidate list and is used to extend the <MEETING PROP.> semantic token to a full parse. This causes a full parse for the <MEETING PROP.> token to be added to the candidate list and the chart. The <SUBJECT> semantic token otherwise does not effect the contents of the chart.

In entry 606, the <MEETING PROP.> semantic token is popped from the candidate list. This causes the partial parse of the <SCH. NEW MEETING> semantic token to be extended by one child token, as indicated in FIG. 6 with the new partial parse that has the dot moved to the right of the <MEETING PROP.> token.

After the <MEETING PROP.> token is removed from the candidate list, the candidate list is once again empty, and the next term "bonus" in the text string can be added to the candidate list. The removal of the term "bonus" from the candidate list has no effect on the contents of the chart, as shown in entry 608.

The next word to be added and popped from the candidate list is the word "structure". As shown in entry 610 of FIG. 6, the word "structure" does not activate any semantic tokens and therefore does not change the contents of the chart.

The next term to be taken from the input string is the word "at". As shown in entry 612 of FIG. 6, when the word "at" is popped from the candidate list, it activates two semantic tokens: <DATE> and <LOCATION>.

The word "four" is the next word to be placed in and taken from the candidate list, as shown in entry 700 of FIG. 7. The word "four" causes the activation of the semantic token <NUMBER> and in fact completes the parse for the token <NUMBER>. As such, a full parse for the token <NUMBER> is added to the chart and the candidate list.

In entry 702, the semantic token <NUMBER> is popped from the candidate list. This causes the semantic token <TIME> to be activated.

After the semantic token <NUMBER> has been removed from the candidate list, the candidate list is once again empty and the next word "o'clock" can be placed in and taken from the candidate list. When the word "o'clock" is removed from the candidate list, it does not activate any new semantic tokens, but causes the semantic token <TIME> to be extended so that a full parse of that token is completed and placed into the candidate list and the chart. The semantic token <TIME> is popped from the candidate list as shown in entry 706. This semantic token completes the partial parse of the semantic token <DATE>. The full parse is then placed into the candidate list and the chart. The <DATE> semantic token is removed from the candidate list as shown by entry 708 and thereby completes the partial parse of the semantic token <SCH. NEW MEETING>. This causes a full parse of the semantic token <SCH. NEW MEETING> to be added to the candidate list and the chart. It is then popped from the candidate list as shown in entry 710 to form the full parse of the input text segment. Thus, the input text segment "Schedule a meeting to discuss the bonus structure at 4:00 is converted into the semantic representation provided by the <SCH. NEW MEETING> token.

Figure 8:
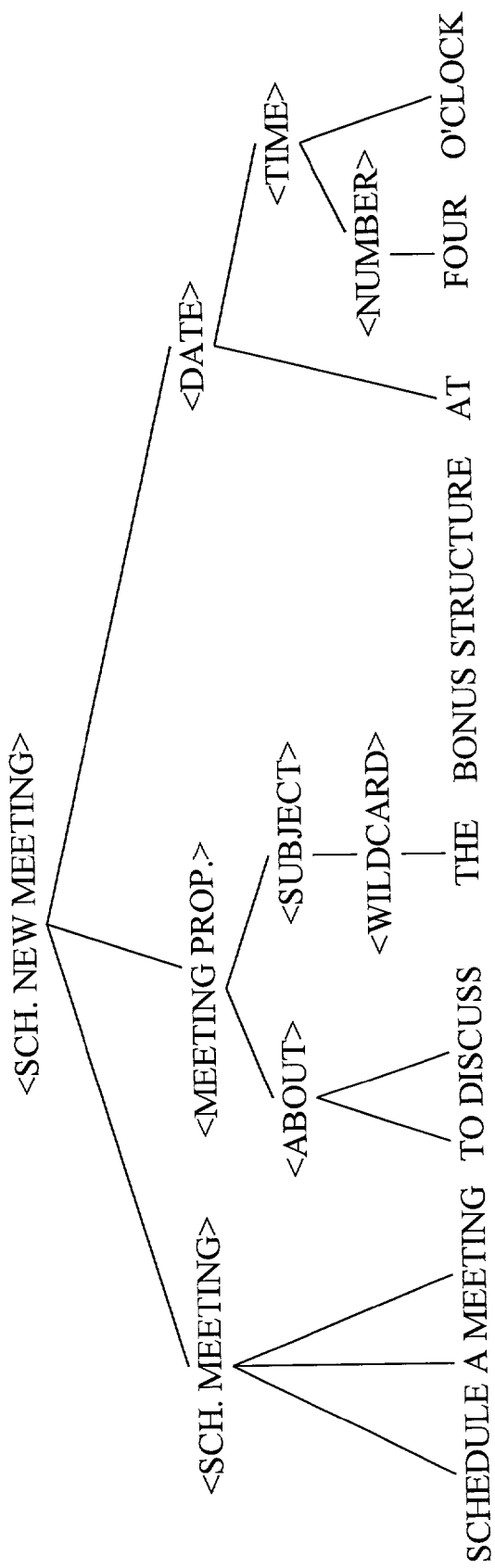
FIG. 8 is a parse tree formed through the parse shown in FIGS. 5, 6 and 7.

FIG. 8 shows a tree structure representing the completed parse created in FIGS. 5, 6 and 7. As can be seen in FIG. 8, the words "bonus" and "structure" are not associated with a higher level semantic token. This occurs because the wildcard is only activated for a single word when a partial parse is expecting a wildcard. To correct this, after the full parse is formed, terms that are not associated with a semantic token are associated with a wildcard token if such a token exists to the left of the unassociated terms. Thus, in FIG. 8, the terms "bonus" and "structure" would be associated with the wildcard semantic token and thus would become part of the subject semantic token. Thus, the subject of the meeting can be discovered to be "the bonus structure".

Note that although not shown in the diagrams of FIGS. 5, 6 and 7, in most embodiments, its preferred that terms be used in a non-wildcard sense before being used in a wildcard sense. Thus, if a decision is to be made between two parses that span the same set of text, a parse that does not involve a wildcard will be preferred over a parse that utilizes a wildcard.

Although the present invention has been described with reference to preferred embodiments, workers skilled in the art will recognize that changes may be made in form and detail without departing from the spirit and scope of the invention.

What is claimed is:

1. A method of generating a semantic representation of a string of words from a language, the method comprising:

identifying at least one semantic token activated by a word;

placing the identified semantic token in a list of potential semantic tokens for the semantic representation of the string of words;

placing a wildcard semantic token in the list of potential semantic tokens for the word, the wildcard semantic token being capable of being activated by every word in the language; and building the semantic representation in part by utilizing one of the semantic tokens in the list of potential semantic tokens through steps comprising:

generating a semantic representation that spans the entire string of words;

identifying a skipped word in the string of words that is not associated with a semantic token in the semantic representation;

determining that a word to the left of the skipped word is associated with a wildcard semantic token; and associating the skipped word with the wildcard semantic token.

2. The method of claim 1 wherein placing semantic tokens in the list comprises placing partial parses of semantic tokens in a chart and full parses of semantic tokens in a candidate list.

3. The method of claim 2 wherein placing partial parses of semantic tokens in the chart comprises providing an indication of the identity of an item needed to extend the partial parse.

4. The method of claim 3 wherein the item needed to extend a partial parse comprises a semantic token.

5. The method of claim 4 wherein the item needed to extend a partial parse comprises a wildcard semantic token.

6. The method of claim 3 wherein placing the wildcard semantic token in the list of potential semantic tokens comprises only placing the wildcard semantic token in the list under two alternative conditions.

7. The method of claim 6 wherein the two alternative conditions comprise A) if the word is the first word in the string of words and the entire sentence can begin with a wildcard according to the grammar; and B) if a partial parse in the chart needs a semantic token that can begin with a wildcard semantic token.

8. A method of parsing text to form a semantic structure, the semantic structure formed of terminal nodes and non-terminal nodes, each non-terminal node being represented by a semantic token that is defined by child nodes beneath the semantic token, the method comprising:

generating a semantic token that has a word in the text as a child node;

generating a wildcard semantic token for a word in the text, the wildcard semantic token being capable of having any word as a child node, generating a wildcard semantic token comprising:

determining if any generated semantic tokens have an unfilled child node that is defined in part by a left-most child node that is expecting a wildcard semantic token; and generating the wildcard semantic token based on the fact that an unfilled child node has a left-most child node that is expecting a wildcard semantic token;

generating a semantic token that has a wildcard semantic token as a child node; and utilizing at least one of the generated semantic tokens in the semantic structure.

9. The method of claim 8 wherein generating a semantic token that has a wildcard semantic token as a child node comprises generating a semantic token that has a wildcard semantic token as a left-most child node.

10. The method of claim 8 further comprising:

identifying a skipped word in the text that has not been associated with a semantic token in the semantic structure;

determining that a word to the left of the skipped word is associated with a wildcard semantic token; and adding the skipped word as a child node of the wildcard semantic token.

11. The method of claim 8 further comprising associating a wildcard semantic token with a previously generated semantic token that is expecting a wildcard semantic token.

12. A computer-readable medium having computer-executable instructions for generating a semantic representation of an input text string by performing steps comprising:

constructing potential portions of the semantic representation based on the input text string;

determining that one of the potential portions of the semantic representation can be extended by a wildcard;

designating a word in the text string as a wildcard to extend the potential portion of the semantic representation;

identifying a skipped word in the input text string that is not directly linked to the semantic representation;

determining that a word adjacent to the skipped word was designated as a wildcard; and designating the skipped word as part of the wildcard.

13. A method of generating a semantic representation of a string of words from a language, the method comprising:

identifying at least one semantic token activated by a word;

placing the identified semantic token in a list of potential semantic tokens for the semantic representation of the string of words;

placing a wildcard semantic token in the list of potential semantic tokens for the word, the wildcard semantic token being capable of being activated by every word in the language, wherein placing the wildcard semantic token in the list of potential semantic tokens comprises only placing the wildcard semantic token in the list under two alternative conditions comprising:

A) if the word is the first word in the string of words and the entire sentence can begin with a wildcard according to the grammar; and B) if a partial parse in the chart needs a semantic token that can begin with a wildcard semantic token; and building the semantic representation in part by utilizing one of the semantic tokens in the list of potential semantic tokens.

14. The method of claim 13 wherein placing semantic tokens in the list comprises placing partial parses of semantic tokens in a chart and full parses of semantic tokens in a candidate list.

15. The method of claim 14 wherein placing partial parses of semantic tokens in the chart comprises providing an indication of the identity of an item needed to extend the partial parse.

16. The method of claim 15 wherein the item needed to extend a partial parse comprises a semantic token.

17. The method of claim 16 wherein the item needed to extend a partial parse comprises a wildcard semantic token.

18. A method of parsing text to form a semantic structure, the semantic structure formed of terminal nodes and non-terminal nodes, each non-terminal node being represented by a semantic token that is defined by child nodes beneath the semantic token, the method comprising:

generating a semantic token that has a word in the text as a child node;

generating a wildcard semantic token for a word in the text, the wildcard semantic token being capable of having any word as a child node;

generating a semantic token that has a wildcard semantic token as a child node;

utilizing at least one of the generated semantic tokens in the semantic structure;

identifying a skipped word in the text that has not been associated with a semantic token in the semantic structure;

determining that a word to the left of the skipped word is associated with a wildcard semantic token; and adding the skipped word as a child node of the wildcard semantic token.

19. The method of claim 18 wherein generating a semantic token that has a wildcard semantic token as a child node comprises generating a semantic token that has a wildcard semantic token as a left-most child node.

20. The method of claim 18 further comprising associating a wildcard semantic token with a previously generated semantic token that is expecting a wildcard semantic token.

* * * * *